Sept. 25, 1945.   C. H. WHITE   2,385,668
PLANTER
Filed May 13, 1942   2 Sheets-Sheet 1
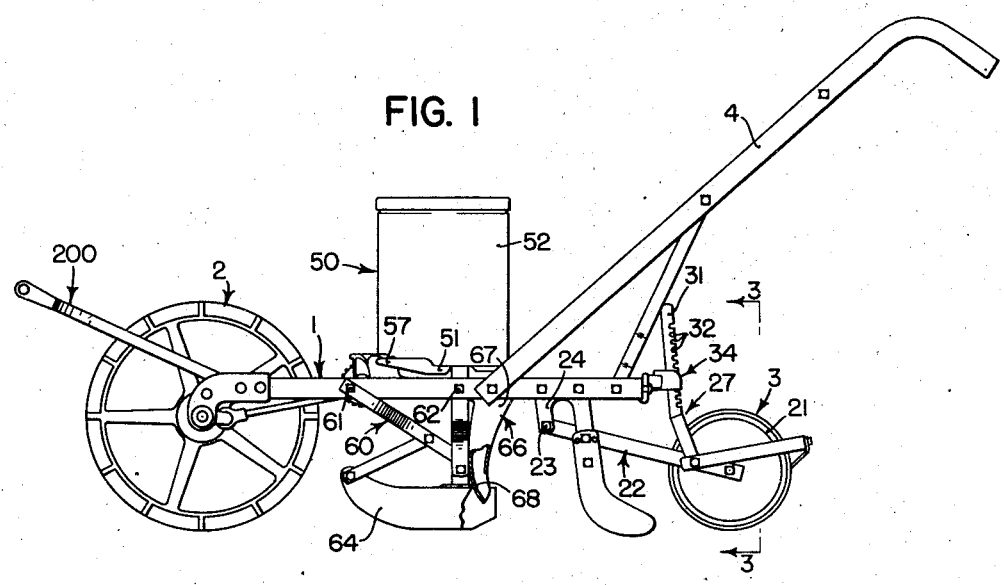
FIG. 1
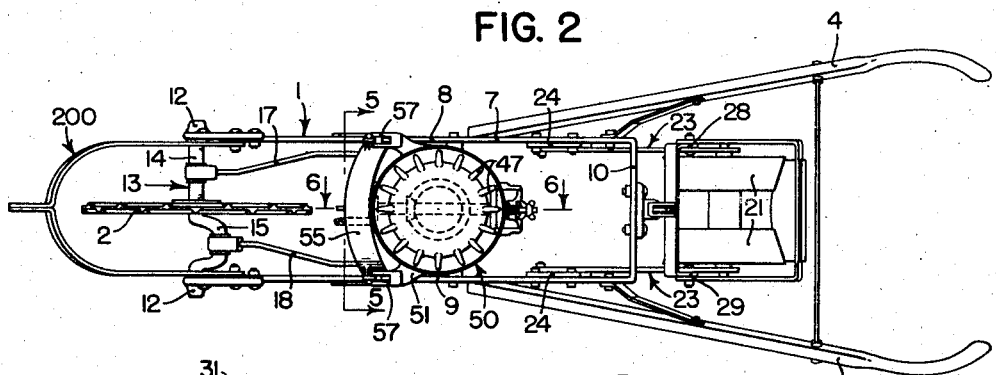
FIG. 2
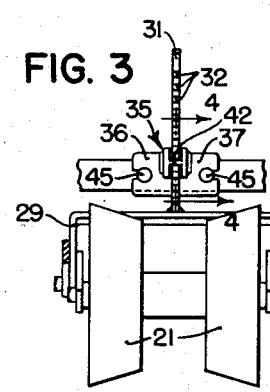
FIG. 3
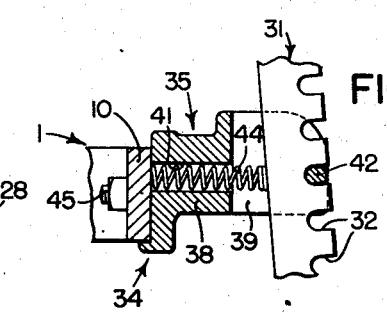
FIG. 4
INVENTOR
CHARLES H. WHITE
BY
ATTORNEYS

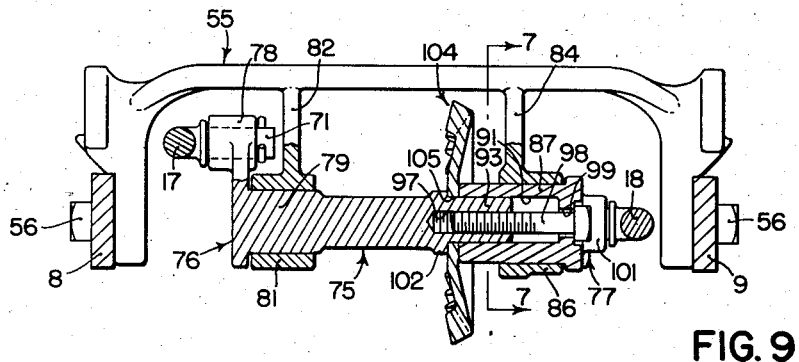
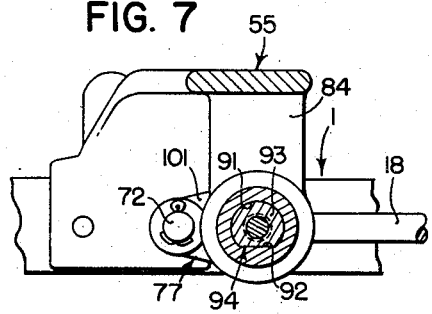
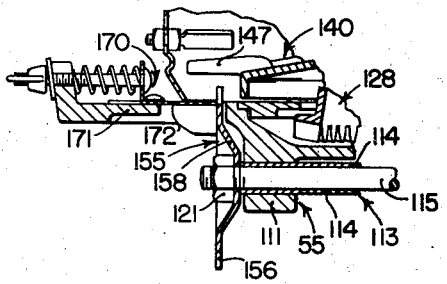
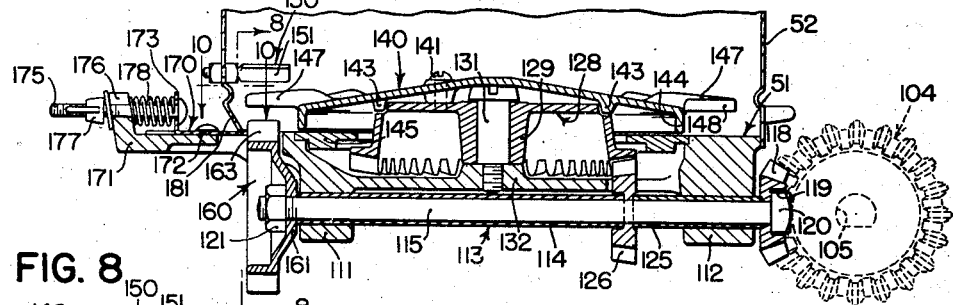
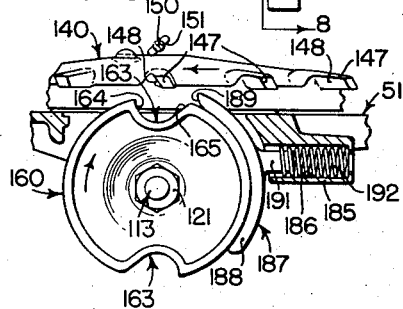

Patented Sept. 25, 1945

2,385,668

UNITED STATES PATENT OFFICE 2,385,668

PLANTER

Charles H. White, Moline, Ill., assignor to Deere & Company, Moline, Ill., a corporation of Illinois Application May 13, 1942, Serial No. 442,833

22 Claims. (Cl. 222—236)

The present invention relates generally to agricultural implements and more particularly to planters, especially planters that are used for planting seed to which adhere, or which are covered by, linty material, as for example, cotton seed. However, the present invention in its various aspects is not limited to use with cotton seed.

The object and general nature of the present invention is the provision of a planter of the hill drop type in which means is provided for forcing or compacting a plurality of linty seeds into the seed cell of a hill drop wheel, the compacted seed being discharged as a unit onto the ground, the parts being so arranged that the seed does not disintegrate or become scattered in the furrow but remain in a ball or mass. Further, it is a feature of the present invention to provide a new and improved planter in which the compacted seed mass or ball is directed generally rearwardly at about the same speed as the speed of forward travel, thereby minimizing any tendency for the mass of seed to disintegrate and become scattered.

Another important feature of the present invention is the provision of a planter of the convertible type, that is, a planter that can be converted from a picker wheel type of planter to a hill drop wheel type of planter, with improved mechanism not only facilitating the change from picker wheel to hill drop wheel but also providing for a change of speed of operation, as is necessary for depositing the seed in hills spaced various distances apart.

Another feature of the present invention is the provision of gearing which is readily changed to secure different hilling distances, and another feature of this invention is the provision of means making it impossible to reassemble the parts incorrectly when effecting a change in the operating ratio.

These and other objects and advantages of the present invention will be apparent to those skilled in the art after a consideration of the following detailed description, taken in conjunction with the accompanying drawings.

In the drawings:

Figure 1 is a side view of a one-row planter in which the principles of the present invention have been incorporated;

Figure 2 is a top view of the planter shown in Figure 1;

Figure 3 is an enlarged fragmentary view, taken along the line 3—3 of Figure 1 and shows the detent mechanism for holding the press wheels in different positions of adjustment;

Figure 4 is an enlarged sectional view taken along the line 4—4 of Figure 3;

Figure 5 is an enlarged sectional view taken along the line 5—5 of Figure 2;

Figure 6 is an enlarged view taken generally along the line 6—6 of Figure 2;

Figure 7 is a sectional view taken along the line 7—7 of Figure 5;

Figure 8 is a sectional view taken along the line 8—8 of Figure 6;

Figure 9 is a fragmentary view, similar to Figure 8, showing the use of a picker wheel instead of a hill drop wheel as shown in Figure 6; and Figure 10 is a sectional view taken generally along the line 10—10 of Figure 6.

Referring now more particularly to Figures 1 and 2, the planter chosen to illustrate the principles of the present invention includes a frame 1 supported at its forward end on a ground or drive wheel 2 and at its rear end on a press wheel unit 3. Suitable handles 4 are fastened to the frame 1. As best shown in Figure 2, the main frame 1 is preferably formed on a single bar 7 bent to form side members 8 and 9 and a rear cross member 10. The front ends of the side members 8 and 9 receive journals 12 in which an axle 13 on which the wheel 1 is fixed, and the axle 13 includes a pair of crank sections 14 and 15. The front ends of pitmans 17 and 18 are connected by suitable bearing means with the cranks 14 and 15, and the rear ends of the pitmans 17 and 18 are connected to rotate the drive shaft for the seeding mechanism to which reference will be made in detail below.

The press wheel unit 3 includes a pair of press wheels 21 carried at the rear portion of a press wheel frame 22, the latter being pivoted, as at 23, to brackets 24 that are fixed to the side bars 8 and 9 of the main frame 1. The yoke 27 is formed of a pair of strap members bent to form downwardly extending arms 28 and 29 that are pivoted to the press wheel frame 22 and an intermediate upwardly extending bar 31 that is provided with a plurality of notches 32. A releasable detent unit 34 is carried at the rear of the main frame 1 and receives the notched bar 31 for holding the press wheels 21 in different positions of adjustment. The detent unit 34 is best shown in Figures 3 and 4 and includes an attaching member 35 having laterally directed slotted lugs 36 and 37 (Figure 3) and a rearwardly directed section 38 having a vertical opening or slot 39 therein and a longitudinally extending spring-receiving opening 41. At the rear side of the opening 39 the two portions of the member 38 are connected together by a bar 42, preferably forming an integral part of the member 35. It will be seen from Figure 4 that the opening 39 receives the bar 31 loosely in so far as fore and aft shifting movement is concerned and that the notches 32 of the bar 31 are adapted to cooperate with the cross bar 42 so that whenever the latter engages in one of the notches 32 the press wheel unit 3 is held in a given position. A spring 44 is disposed in the opening 41 and bears at its rear end against the bar 31. The opening 41 extends from the opening 39 forwardly to the face of the member 38 that is adapted to engage the rear side of the cross bar 10 of the frame 1. Bolts 45 serve to fix the member 35 in position on the main frame 1.

The particular detent structure just described is capable of quick assembly and is inexpensive to manufacture. When assembling the parts, the bar 31 is first inserted into the opening 39 while the member 35 is detached from the frame 1. After the member 31 is in place in the opening 39, the spring 44 is inserted into the opening 41 from the forward face of the member 35. Lastly the latter member is bolted to the bar 10, which places the spring 44 under compression between the bar 10 and the bar 31. In operation, when the operator desires to change the position of the press wheel unit 3, all he has to do is to place one foot against the upper end of the bar 31 and push forwardly, which disengages the bar 31 from the detent bar 42 (Figure 4), and then the operator raises up on the handles 4 or pushes down on the handles, according to whether he wants to lower or raise the position of the press wheel unit 3 relative to the main frame.

The planting mechanism is indicated in its entirety by the reference numeral 50 and comprises a base or hopper bottom 51 on which a hopper or seed container 52 is carried. The hopper bottom 51 is detachably connected to a supporting structure including an arched casting or bracket 55 the ends of which are bolted, as at 56, Figure 5, to the side bars 8 and 9 of the main frame 1. The hopper bottom 51 includes apertured lugs 57 which engage portions of the bracket 55 for holding the seeding unit 50 in proper position.

Secured to the main frame 1 is a runner and spout support framework, indicated in its entirety by the reference numeral 60, which is bolted, as at 61 and 62, to the side frame bars 8 and 9. A furrow opener 64, which may be a runner or shoe opener, is secured to the lower end of the supporting framework 60, and the latter also supports a spout 66 of particular construction. As best shown in Figure 1, the spout 66 has a wide upper end 67 and a downwardly and rearwardly curved lower end 68, the upper portion curving forwardly and downwardly and then merging into the downwardly and rearwardly curving portion 68, the purpose of which will appear later.

The means for driving the seeding mechanism derives power from the front or ground wheel 2. Mention was made above of the pitmans 17 and 18 that are connected at their forward ends to the wheel driven cranks 14 and 15. The rear ends of the two pitmans 17 and 18 are bent laterally inwardly, as shown in Figure 5, and as indicated at 71 and 72, respectively, for connection with a driving shaft indicated in its entirety by the reference numeral 75. The drive shaft structure 75 is formed of two telescopically associated parts or pitman cranks, indicated by the reference numerals 76 and 77. The part 76 includes a crank proper 78 which is bored to receive the pitman end 71. The member 76 includes a cylindrical portion 79 which is received within a journal 81 forming a part of a downward extension 82 of the bracket casting 55. A similar downward extension 84 at the other side of the bracket 55 carries a journal 86 in which the cylindrical portion 87 of the other driving shaft section 77 is disposed. The cylindrical portion 87 is larger than the cylindrical section 79 so that there is no possibility of installing the parts 76 and 77 in the wrong place. Also, the larger cylindrical portion 87 is provided with an internal recess 91 which, as best shown in Figure 7, is non-circular, having a flat, as shown at 92. The inner end of the companion shaft section 76 is of similar cross section, and is indicated by the reference numeral 93 and has a companion flat 94. A bore 97 in the inner end of the end 93 is tapped to receive a cap screw 98 which extends from the other end of the other shaft section 77 through an opening 99. Tightening the cap screw 98 serves to hold the two driving shaft parts 76 and 77 together, and the telescopic association of the two non-circular ends predetermines the angular relation between the two cranks 78 and 101, the latter being the crank to which the pitman 18 is connected, as at 72 (Figure 7). A flange 102 is formed on the drive shaft member 76, and the end 93 of the latter receives a drive gear 104 the center portion of which is provided with an opening 105 conforming to the non-circular cross section of the end 93, whereby the gear 104 is fixed to the drive shaft 75 to rotate therewith. The parts are arranged so that when the cap screw 98 is tightened the gear 104 is clamped between the flange 102 and the laterally inner end of the cylindrical section 87 of the member 77.

Referring now to Figure 6, the hopper base 51 is provided with a pair of downwardly extending lugs 111 and 112 which are apertured to receive a shaft 113. The shaft 113 comprises a long bushing 114 and a relatively long connecting bolt 115. At one end the shaft 113 receives a pinion 118, one face of which is provided with a square or other non-circular socket 119 in which the head 120 of the bolt 115 is disposed. The other end of the bolt 115 is threaded to receive a nut 121. Disposed on the bolt 115 is a shorter sleeve or bushing 125 one end of which seats against the pinion 118, and between the two sleeves 114 and 125 is a drive pinion 126 that meshes with a ring gear 128 having a hub 129 that is mounted for rotation on a stud 131 screwed into a threaded boss 132 on the hopper bottom 51.

For planting cotton, a cotton feed plate 140 is secured for rotation with the gear member 128 by means of a screw 141 extending through an opening in the plate 140 and threaded into the gear 128, as shown in Figure 6. The cotton feed plate 140 has one or more lugs 143 which engage suitable recesses in the gear 128, and a peripheral portion of the cotton feed plate 140 is provided with a downturned flange 144 that rests on a ring or plate 145 carried by the hopper bottom 51. The cotton feed plate 140 is provided with a set of peripheral radially outwardly extending fingers 147, each of which has a face 148 disposed at an angle of approximately thirty degrees with respect to the vertical and facing generally in the direction of rotation of the part 140, as indicated by the arrow in Figure 8. As best shown in Figure 6, the fingers 147 extend radially outwardly to a point adjacent the lower edge of the cam or hopper 52, and disposed above the fingers 147 a short distance is a pin 150 fastened to the can wall substantially directly above the teeth or fingers 147. The pin or projection 150 is arranged, as best shown in Figure 8, with one wall 151 disposed in an angled position so that not only does the pin 150 prevent the entire mass of seed from circulating as a body with the rotating cotton feed plate 140 but, in addition, the angular disposition of the face 151 serves to cause the seed to be forced downwardly into the seed receiving wheel that is fixed to the rear end of the shaft 113. According to the principles of the present invention, as illustrated in the form shown in Figure 9, the seed receiving wheel may be in the form of a picker wheel 155 which has a toothed periphery 156, similar to the picker wheel shown in U. S. Patent No. 1,512,256, issued October 21, 1924, to Charles E. White, to which reference may be made if necessary. The picker wheel 155 includes a dished central portion 158 which is apertured to receive the threaded end of the bolt 115 whereby when the nut 121 is tightened the picker wheel is clamped against the rear end of the bushing 114 and caused to rotate by the rotation of the shaft 113. As shown in Figure 6, the pinion 118 on the forward end of the shaft 113, in operation, meshes with the drive gear 104.

According to the present invention, a hill drop wheel may be substituted for the picker wheel 155, and in Figures 6 and 8 I have shown the hill drop wheel fastened to the shaft 113 in lieu of the picker wheel 155 which is shown in Figure 9. The hill drop wheel is indicated in its entirety by the reference numeral 160 and comprises a drum-like member having a central apertured flange 161 that is apertured to receive the threaded end of the bolt 115. The peripheral portion of the hill drop wheel 160 is flanged and provided with a pair of cells 163, preferably arranged in diametrically opposite relation. Each of the seed receiving cells 163 is provided with a substantially perpendicular wall 164 and a slanting or inclined wall 165. If the picker wheel 155, as shown in Figure 9 is in place, it is a simple matter to remove the wheel 155 by unscrewing the nut 121 and replacing it by the hill drop wheel 160, and then reapplying the nut 121 and tightening it until all of the parts are firmly held together.

When the picker wheel 155 (Figure 9) is used, the rate of flow of the seed is under the control of a sliding gate 170. The gate 170 is mounted on an extension 171, best shown in Figure 6, of the hopper bottom 51, the gate 170 including a flat section 172 slidable on the extension 171 toward and away from the picker wheel 155 and a lug section 173 (Figure 6) that is apertured to receive an adjusting bolt 175, the outer end of which extends outwardly through a lug 176 on the extension 171. A thumb nut 177 is threaded onto the outer end of the bolt 175 and a spring 178 is disposed between the lug 176 and the gate lug 173. This adjustable feed gate construction is substantially similar to that shown in the above-mentioned White patent, and when employed with the picker wheel 155, as shown in Figure 9, the position of the gate section 172 determines the rate of flow of the seed from the hopper. However, when it is desired to replace the picker wheel 155 by the hill drop wheel 160, the gate 170 is adjusted to its outermost position, as shown in Figure 6, so as to receive the hill drop wheel, which is considerably thicker in an axial direction, than the picker wheel 155. As best shown in Figures 6 and 10, one wall of the hopper 52 is bent inwardly and downwardly to form a plane portion 181 that slants downwardly and inwardly, terminating in a position closely adjacent the outer edge of the hill drop wheel 160 and serving to direct seed generally laterally downwardly and radially inwardly into the cells 163 during the rotation of the hill drop wheel 160.

A novel form of cut-off is supplied for use with the hill drop wheel 160, and referring now more particularly to Figure 8, it will be seen that the hopper bottom 51 is provided with an extension 185 which is provided with an internal bore 186 that is adapted to receive a cut-off which is indicated in its entirety by the reference numeral 187. The cut-off 187 includes an arcuate section 188 having a beveled nose 189 and a central stud 191 to which one end of a spring 192 is securely fixed in any suitable manner. The lug 191 is disposed loosely in the bore 186, and the section 188 of the cut-off is concentric with respect to the peripheral portion of the hill drop wheel 160. Briefly, the function of the cut-off 187 is to separate the seed forced into the cell 163 from the mass of seed in the hopper, and the exact manner in which the cut-off 187 performs this function will be set forth in more detail below.

Mention was made above of the fact that when using the picker wheel 155 the rate of flow of the seed may be controlled by disposing the gate 170 in the proper position on the hopper bottom extension 171. However, when the picker wheel 155 is replaced by the hill drop wheel 160, as shown in Figure 6, some other means must be provided for controlling the seed flow. It will be understood that the hill drop wheel 160 is used when it is desired to deposit a plurality of seed in a bunch, thereby forming what is termed a hill, the hills being spaced apart a distance in the order of twelve to eighteen inches, whereas when using the picker wheel 155, the seed is deposited in the furrow more or less in a continuous stream, one seed at a time. Under certain conditions and in certain localities one type of planting is preferred while under other conditions and/or in other localities, the other type of planting is preferred. The present invention therefore provides an implement that may easily be adapted for use in either drilling or planting in hills as desired.

While it is possible to provide several hill drop wheels with different members of seed cells, in order to vary the hill spacing, it is preferable to provide a gear change arrangement that permits finer adjustment of hill spacing than would be afforded by replacing, say, a two-cell wheel for a three-cell wheel. It will be remembered that the ground wheel 2 drives the drive shaft 75 through a pair of pitmans 17 and 18 and that the gear 104 on the drive shaft 75 meshes with the pinion 118 to drive the cotton feed wheel 140 and also the picker wheel 155 when the latter is the seed receiving wheel that is fixed to the rear end of the shaft 113. The particular ratio of the two gears 104 and 118 is chosen so that not only is the picker wheel 155 driven at the desired speed but also the ratio afforded by the gears 104 and 118 is such that the hilling distance secured by replacing the picker wheel 155 with the two-cell hill drop wheel 160 is the usual hilling distance conventionally used, which is in the neighborhood of 12½ inches. However, as mentioned above, not infrequently other hilling distances are desired, and in order to secure different hilling distances the present invention includes structure making it possible to replace the gears 104 and 118 conveniently and quickly by any one set of a number of other sets of gears which are available. For example, in order to replace the gear 118, all that it is necessary to do is to loosen the nut 121, take out the bolt 115, remove the pinion 118 and substitute the corresponding pinion of the other set, then replacing the parts. In order to remove the gear 104 and replace it by a gear of different size, all that it is necessary to do is to remove the cap screw 98, which will then permit the two sections 76 and 77 of the drive shaft 75 to separate. By turning the cranks 78 and 101 into a position in which they clear the adjacent parts of the bracket 55, the two shaft sections 76 and 77 may be separated far enough to permit the gear 104 to be removed from between the adjacent ends of the shaft sections 76 and 77, without disconnecting the pitmans 17 and 18, there being some looseness in the connections to permit the latter parts to be spread apart a certain amount at their rear ends. After replacing the gear 104 by a similar gear but one of a different size, the parts may be reassembled by telescoping the end 93 into the bore 91 of the section 77, then replacing and tightening the cap screw 98. This not only clamps the two drive shaft parts 76 and 77 together but also firmly secures the new gear 104 in place. In order to provide access to the parts for changing the gears as just described, the hopper 50 is swingable in a generally upward direction about its connection through the lugs 57 with the framework, but since this arrangement of the hopper is conventional, no further description is believed to be necessary. When the hill drop wheel 160 is used the cotton gate 170 is closed until it almost touches the hill drop wheel and underlies the slanting planar section 181 of the can.

The operation of the present invention is substantially as follows.

The implement is drawn across the field by a suitable source of power, such as a draft animal, connected with a hitch yoke 200 (Figures 1 and 3), the operator walking behind the implement, and grasping the handles 4. The implement is supported on the front ground wheel 2 and the rear press wheel unit 3, and as the ground wheel 2 rotates, the rotation of the cranks 14 and 15 acts through the pitmans 17 and 18 to cause the rotation of the drive shaft 75 in the same direction. This rotates the gear 104 which, being in mesh with the pinion 118, rotates the seeding shaft 113. The pinion 126 on the latter shaft rotates the cotton feed plate 140 and also the picker wheel 155 or the hill drop wheel 160, according to whether one or the other is used. The advancing faces 148 of the fingers 147 on the feed plate 140 are angled so that as the faces 148 come into contact with the cotton seed, the latter is forced downwardly, this action being augmented by the angular disposition of the face 151 on the stationary pin 150 carried by the hopper can 52. This increases the steadiness and uniformity of flow, and also increases the quantity of seed deposited as compared with prior devices, both when using the picker wheel as well as when using the hill drop wheel. However, the angled faces 148 serve a particular function when using the celled hill drop wheel. Cotton seed are usually covered with a linty material, and the action of forcing the seed downwardly into the seed cells 163, the seed being guided into the seed cells by the inclined wall 181, results in packing the seed firmly into the seed cell and causing them to be pressed together with sufficient force to form a coherent tightly compacted mass in the nature of a ball or bunch of seed that tends to hang together. As the hill drop wheel 160 rotates, which is in the direction of the lower arrow shown in Figure 8, the filled seed cell 163 passes over into engagement with the cut-off 187. The latter embraces a considerable portion of the periphery of the hill drop wheel. The nose 189 of the cut-off 187 is beveled so as to separate the seed compacted in the seed cell 163 from the mass of seed in the hopper. However, there is little likelihood of any seed becoming broken because if there should be, for example, an excess quantity of seed carried by the seed cell 163, the inclined nose 189 on the cut-off 187 rides upwardly or outwardly, since the cut-off 187 is resiliently mounted about its generally central portion. Being thus mounted, even though one end of the cut-off should be forced away from the periphery of the hill drop wheel, the other end of the cut-off is still held against the wheel. This has the effect of continually urging the seed lying outside of the periphery of the hill drop wheel entirely into the seed cell, thus providing a more positive cut-off and eliminating any likelihood that any of the seed in the compacted mass being pulled out of the seed cell by the seed that the cut-off separates from the mass of seed in the seed cell. Even if one seed should get between the hill drop wheel and the cut-off, due to the rockable resilient mounting of the latter the cut-off is nevertheless yieldingly held in a position retaining the compacted mass of seed in the seed cell, holding them in that position not only against gravity as the seed cell approaches the lower portion of the wheel but also against centrifugal force due to the rotation of the seed wheel. This is not a negligible force since the hill drop wheel usually rotates at a rate of several times a second. It will be noted that the lower portion or tail of the cut-off 187 effectively holds the compacted bunch of seed in its seed cell until the latter is near the bottom of the wheel. As the seed cell emerges from contact with the inner face of the cut-off, the seed is then free to drop to the ground under the action of gravity and also due to the centrifugal force just mentioned. It will be noted from Figure 1 that the rearwardly and downwardly curved portion 68 of the spout 66 directs the compacted bunch of seed rearwardly. These parts are so arranged that the rearward component of movement of the mass of compacted seed is substantially equal to the rate of forward travel of the machine, yet the inclination of the curved wall section 68 is such that there is no tendency for the compacted mass of seed when it strikes the wall 68 to become disintegrated. It will be remembered that the prime object of hill planting is to have the bunch of seed remain in a compact tightly held mass or ball of seed, rather than having the individual seed strung out along the furrow.

Mention has been made above of the fact that the gate 170 may be adjusted to accommodate either the picker wheel 155 or the hill drop wheel 160, and the manner of changing the gears 104 and 118 for another set of gears of different sizes has been explained, this being particularly a requirement for hill dropping so as to vary the hilling distance. It will thus be seen that I have provided a new and improved hill drop planter and, in addition, have provided a planter that is readily convertible from a picker wheel type to the hill drop type. Therefore, while I have shown and described above the particular structure in which the principles of the present invention have been embodied, it is to be understood that my invention is not to be limited to the particular means shown and described above, but that, in fact, widely different means may be employed in the practice of the broader aspects of my invention.

What I claim, therefore, and desire to secure by Letters Patent is:

1. In a cotton planter, a hopper, a hill-drop wheel having at least one seed-receiving cell adapted to receive a plurality of seed therein, a plate mounted for rotation in the hopper and having fingers with faces so angled with respect to the rotation of the plate that seed are forced generally downwardly into and compacted in the cell of said hill-drop wheel, and means cooperating with said angled fingers for directing seed generally laterally into said seed cell.

2. In a cotton planter, a hopper, a hill-drop wheel having at least one seed-receiving cell adapted to receive a plurality of seed therein, a stationary part carried by the hopper, and a rotatable agitator wheel having peripheral teeth with beveled lower faces angled upwardly and forwardly in the direction of rotation, said stationary part being disposed adjacent the path of movement of said teeth so as to resist movement of the seed with said agitator and thus provide a point of reaction whereby the movement of said beveled teeth may serve to compact the seed and force the seed generally downwardly into the cell of said hill-drop wheel in the form of a compacted ball or mass of seed.

3. In a hill drop planter for cotton and the like, a hopper bottom having an opening, a hill drop wheel having one or more seed receiving cells, each of which is open at the top and at least at one of its ends, means rotatably mounting said hill drop wheel in a position in which the portion of said wheel having the cells extends through said hopper bottom opening and into said hopper, a movable feed plate in said hopper and having seed engaging fingers each with a downwardly inclined surface facing generally in the direction of movement, and means on the hopper cooperating with said movable fingers for forcing seed into said cells from the ends and outer portions thereof.

4. In a hill drop planter, a hill drop wheel, a cut-off therefor adapted to fit against the periphery of said wheel, and means for supporting said cut-off for rocking movement about a generally central axis and for generally translational movement toward and away from said wheel.

5. In a hill drop planter, a support having a socket, a hill drop wheel rotatably mounted on said support adjacent said socket, an arcuate cut-off having a part loosely seated in said socket, and resilient means in said socket acting against said part for pressing said cut-off against said hill drop wheel.

6. A cut-off for use with a rotatable wheel, comprising an elongated arcuate member having a generally outwardly extending lug disposed generally centrally of said member, and a biasing spring fixed at one end to said lug.

7. A cotton planter of the type convertible from a hill drop to a picker wheel drop and vice versa, comprising a hopper bottom having a discharge opening, a rotatable support extending at one end to a point adjacent said discharge opening, a picker wheel and a hill drop wheel adapted optionally to be connected to said end of the rotatable support so as to be disposed in said opening to receive seed therethrough, gear means for driving said rotatable support, and means for changing the gear ratio so as to provide different hilling distances when the hill drop wheel is fixed to the rotatable support in lieu of said picker wheel.

8. A cotton planter of the type convertible from a hill drop to a picker wheel drop and vice versa, comprising a hopper bottom having a discharge opening, a rotatable support extending at one end to a point adjacent said discharge opening, a picker wheel and a hill drop wheel adapted optionally to be connected to said end of the rotatable support so as to be disposed in said opening to receive seed therethrough, and means for driving said rotatable support comprising a pinion removably fixed on said rotatable support, a drive shaft comprising separable sections, and a gear on said drive shaft removable therefrom by separating said sections, said pinion and gear being removable so as to be replaced by a pinion and gear of a different ratio and thereby provide, when the hill drop wheel is fixed to the rotatable support in lieu of said picker wheel, for changing the hilling distance.

9. A cotton planter of the type convertible from a hill drop to a picker wheel drop and vice versa, comprising a hopper bottom having a discharge opening, a rotatable support extending at one end to a point adjacent said discharge opening, a picker wheel and a hill drop wheel adapted optionally to be connected to said end of the rotatable support so as to be disposed in said opening to receive seed therethrough, and means for driving said rotatable support comprising a pinion removably fixed on said rotatable support, a drive shaft comprising separable sections telescopically associated, each section having a non-circular part and the part on one section being adapted to receive the part on the other section, there being a flange on said other section, a gear having a central non-circular opening adapted to receive the non-circular part of said other section so as to provide for disposing said gear between said flange and the inner end of said one section, releasable means for holding said sections together with said gear clamped therebetween, the release of said releasable means providing for separation of said sections and the removal of said gear therefrom and the removal of said pinion providing for the substitution of a pinion and gear of a different ratio, thereby providing, when the hill drop wheel is fixed to the rotatable support in lieu of said picker wheel, for planting at a different distance between the hills.

10. A hill drop planter comprising a hopper bottom having a discharge opening, a rotatable support extending at one end to a point adjacent said discharge opening, a hopper on said hopper bottom, a celled hill drop wheel connected to said end of the rotatable support so as to be disposed in said opening to receive seed therethrough, and means on said hopper for guiding seed toward the cells of said hill drop wheel.

11. A hill drop planter comprising a hopper bottom having a discharge opening, a rotatable support extending at one end to a point adjacent said discharge opening, a hopper on said hopper bottom, a celled hill drop wheel connected to said end of the rotatable support so as to be disposed in said opening to receive seed therethrough, and a wall section on said hopper having a straight edge disposed substantially flat against said hill drop wheel and angled so as to guide seed toward the cells of said hill drop wheel from one side thereof.

12. A hill drop planter comprising a hopper bottom having a discharge opening, a rotatable support extending at one end to a point adjacent said discharge opening, a hill drop wheel connected to said end of the rotatable support so as to be disposed in said opening to receive seed therethrough, and means for driving said rotatable support comprising a pinion removably fixed on said rotatable support, a drive shaft comprising separable sections, and a gear on said drive shaft removable therefrom by separating said sections, said pinion and gear being removable so as to be replaced by a pinion and gear of a different ratio and thereby provide for changing the hilling distance.

13. In a planter, a drive gear bracket having a pair of laterally spaced bearing sections, one having a larger internal diameter than the other, a pair of separable shaft sections of unequal diameter and adapted to be disposed, respectively, in said bearing sections, and a gear clamped between said separable shaft sections and adapted to be disconnected therefrom by separating said sections, the unequal diameter of said bearing and shaft sections serving to prevent improper subsequent reassembly of said shaft sections.

14. A planter comprising a hopper bottom having a discharge opening, a rotatable support extending at one end to a point adjacent said discharge opening, a seed wheel fixed to said rotatable support so as to be disposed in said opening to receive seed therethrough, and means for driving said rotatable support comprising a pinion removably fixed on said rotatable support, a drive shaft comprising separable sections, and a gear on said drive shaft removable therefrom by separating said sections, said pinion and gear being removable so as to be replaced by a pinion and gear of a different ratio.

15. In a planter of the crank driven type, a drive shaft comprising separable sections, and a gear on said drive shaft removable therefrom by separating said sections, a crank on each of said sections, and cooperating means on said sections serving to permit them to be reassembled in only one angular position of the cranks.

16. A hill drop planter comprising a hopper bottom having a discharge opening, a rotatable support extending at one end to a point adjacent said discharge opening, a hopper on said hopper bottom, a celled hill drop wheel connected to said end of the rotatable support so as to be disposed in said opening with the cell or cells thereof on the upper part of the wheel open at their sides at least partially above the lower part of said opening, and means for guiding seed laterally toward the cells of said hill drop wheel.

17. A planter comprising seeding mechanism, shaft means for driving said mechanism, a pinion removably fixed to said shaft means, a drive shaft comprising separable sections, and a gear on said drive shaft removable therefrom by separating said sections, said pinion and gear being removable so as to be replaced by a pinion and gear of a different ratio and thereby provide for driving said seeding mechanism at a different rate.

18. A planter comprising seeding mechanism, shaft means for driving said mechanism, a pinion removably fixed to said shaft means, a drive shaft comprising separable sections telescopically associated, each section having a non-circular part and the part on one section being adapted to receive the part on the other section, there being a flange on said other section, a gear having a central non-circular opening adapted to receive the non-circular part of said other section so as to provide for disposing said gear between said flange and the inner end of said one section, releasable means for holding said sections together with said gear clamped therebetween, the release of said releasable means providing for separation of said sections and the removal of said gear therefrom and the removal of said pinion providing for the substitution of a pinion and gear of a different ratio, thereby providing for driving said seeding mechanism at a different rate.

19. In a hill-drop planter, a hill-drop wheel, a cut-off therefor having an arcuate portion adapted to fit against the periphery of said wheel, and means for supporting said cut-off for translational movement toward and away from said wheel in a generally radial direction.

20. A cut-off as defined in claim 19, further characterized by means providing for rocking movement of the cut-off.

21. A hill drop planter comprising a hopper bottom having a discharge opening, a rotatable support extending at one end to a point adjacent said discharge opening, a hopper on said hopper bottom, a celled hill drop wheel connected to said end of the rotatable support so as to be disposed in said opening to receive seed therethrough, an agitator having fingers beveled on their lower sides, and means including an inwardly extending member on the hopper cooperating with said beveled fingers for forcing seed downwardly toward the cells of said hill drop wheel.

22. A hill drop planter comprising a hopper bottom having a discharge opening, a rotatable support extending at one end to a point adjacent said discharge opening, a hopper on said hopper bottom, a celled hill drop wheel connected to said end of the rotatable support so as to be disposed in said opening to receive seed therethrough, an agitator having fingers beveled on their lower sides, a wall section on said hopper having a straight edge disposed substantially flat against said hill drop wheel and angled so as to guide seed toward the cells of said hill drop wheel from one side thereof, and means including an inwardly extending member on the hopper cooperating with said beveled fingers for forcing seed downwardly toward said guiding wall section and the cells of said hill drop wheel.

CHARLES H. WHITE.